J. T. REEVES.
NAVIGATIONAL INSTRUMENT.
APPLICATION FILED SEPT. 12, 1919.

1,401,362.

Patented Dec. 27, 1921.
5 SHEETS—SHEET 5.

Inventor:
Joseph T. Reeves.

UNITED STATES PATENT OFFICE.

JOSEPH T. REEVES, OF BROOKLYN, NEW YORK, ASSIGNOR OF TWENTY-FIVE ONE-HUNDREDTHS TO ROBERT M. HAYES, OF BROOKLYN, NEW YORK.

NAVIGATIONAL INSTRUMENT.

1,401,362.      Specification of Letters Patent.      Patented Dec. 27, 1921.

Application filed September 12, 1919. Serial No. 323,417.

*To all whom it may concern:*

Be it known that I, JOSEPH T. REEVES, a citizen of the United States, residing in Brooklyn, in the county of Kings and the State of New York, have invented new and useful Improvements in Navigational Instruments, of which the following is a specification.

My invention relates to charts and compasses, and has for its object the provision of means by which the direction in which a vehicle is traveling may be indicated; and in addition to this compass feature of the instrument, my invention has for its object, the provision of means by which the position of the vehicle (that is—the latitude and longitude of the point on the earth's surface occupied by the vehicle) may be automatically indicated on a chart, and the course of the vehicle automatically traced on the same chart—the chart being a part of the instrument itself. By the use of this instrument, the necessity for the customary astronomical observations in clear weather and the navigator's dead reckoning after a period of fog for the purpose of determining his latitude and longitude is eliminated. I attain these objects by the use of the mechanisms illustrated in the accompanying drawings in which:—

The instrument comprises a suitable base plate (10) maintained in a fixed position on the vehicle and supporting two independently mounted gyroscopic elements. One of these elements is described as a spherical case or carrier (1) controlled by three pairs of electrically driven gyro-rotors (2) inclosed within and supported by the case; each gyro rotating on the same axis as its mate but in the opposite direction. The axes of the rotors are the three lines which pass through the center of the case at right angles to each other. The axis of one pair of rotors will be referred to in the description as the north-south axis. The spherical case is supported in a Cardan ring (3) on trunnions, the centers of which are in the line of the north-south axis. This ring is supported in another ring (4) on trunnions the centers of which are in the same plane with, and at right angles to the north-south trunnions. The latter ring is supported in a rotatable frame (5) on trunnions that are in line with the north-south trunnions. These axial points are so arranged that they may all be brought into the horizontal plane which passes through the center of the spherical case. The rotatable frame (5) consists of an annular section (5') to which are fixed arms or supports (5²) curved in shape, reaching down and terminating in a pivot (6) located in the vertical center line of the annular section, at a point as distant as practicable from the horizontal central plane of the spherical case. The pivot is ball shaped and rests in a socket (7) having a radius somewhat greater than that of the pivot. The socket does not have a fixed position, but is carried by a floor or spider (7') which is suspended from the fixed framework (8) of the instrument by means of four rods (9) provided with universal joints (9'). The points in the fixed framework from which the floor is suspended are in the horizontal central plane of the spherical case. The eight universal joints are equi-distant from the vertical center line of the spherical case, and in parallel horizontal planes—four in each plane; the lower plane being the one which passes through the center of the ball shaped pivot. The rods extend above their upper universal joints to a degree sufficient to permit them to carry weights (9²) of sufficient magnitude to counterbalance the entire pendulous mass they support; thus rendering the mass non-pendulous and not susceptible to the influence of the forces which set up oscillations in pendulous bodies. The fixed framework (8) referred to consists of an annular section 8' clearing freely the annular section 5' of the rotatable frame (5) and supported on posts (8²) fixed to and reaching up from the baseplate (10) of the instrument. Positioned on the fixed framework (8) is a series of ball bearing rollers (5³) of as large diameter as practicable and having vertical shafts. These rollers are so placed that they are in contact with the periphery of the annular section (5') of the rotatable frame (5) in the horizontal central plane of the spherical case (1). They prevent any lateral movement of the rotatable frame (5) and in combination with the socket carrying floor or spider (7') constitute a support for the rotatable frame and gyroscopic element which is frictionless to a high degree. The distinctive feature of the support described is that the supported mass is rendered non-pendulous and its entire weight is carried on a single point.

Figure 1:
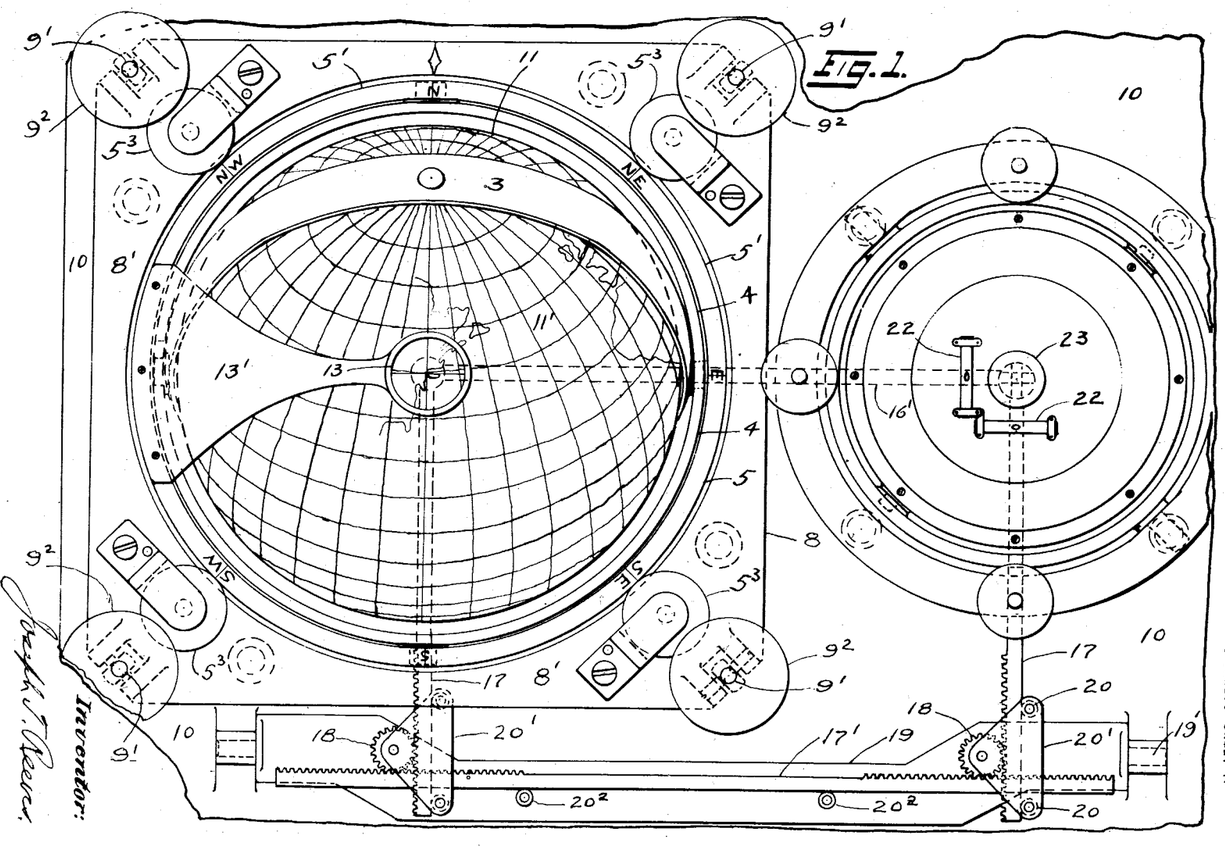
Figure 1 is a plan view of the instrument as it would appear when set for departure from the port of New York.
Figure 2:
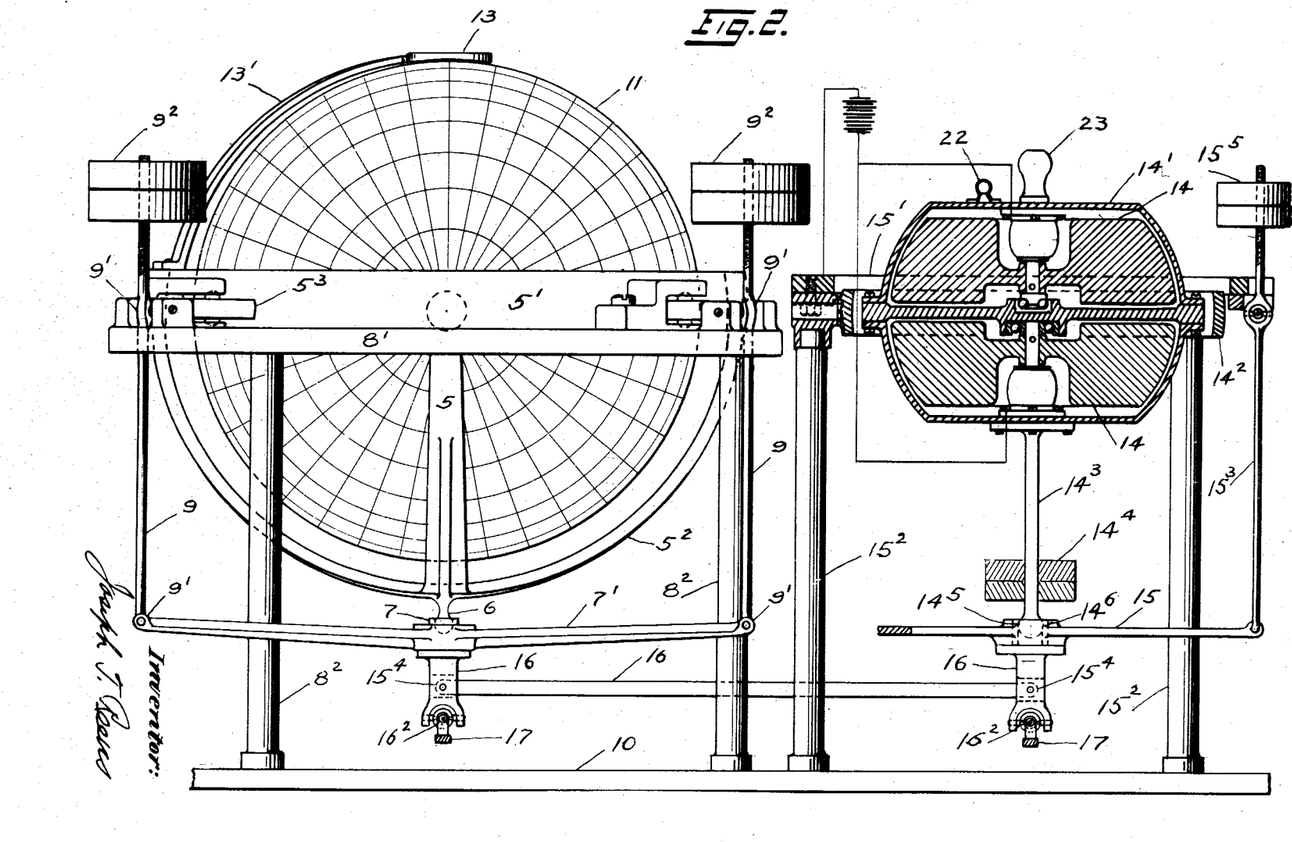
Fig. 2 is a side elevation (partly in section) of the instrument in a horizontal position before being set for a specific course.
Figure 3:
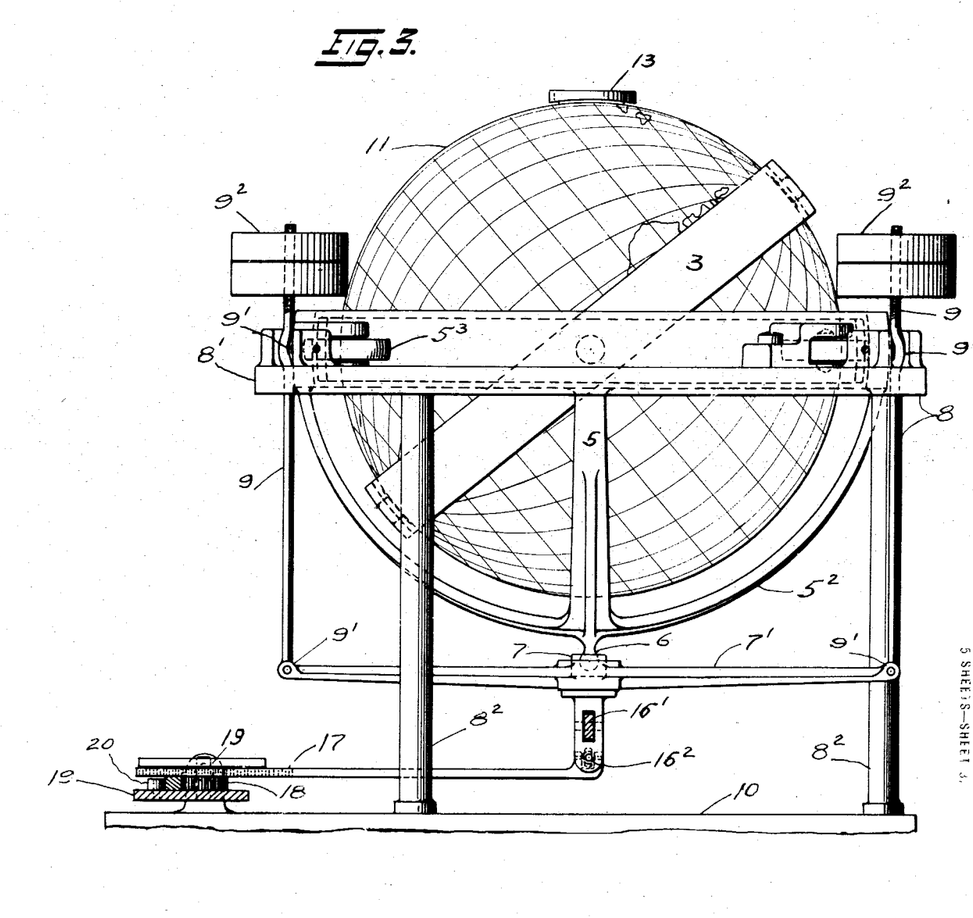
Fig. 3 is an end elevation with the instrument in the same position as in Fig. 1 with certain detals in section and others omitted.
Figure 4:
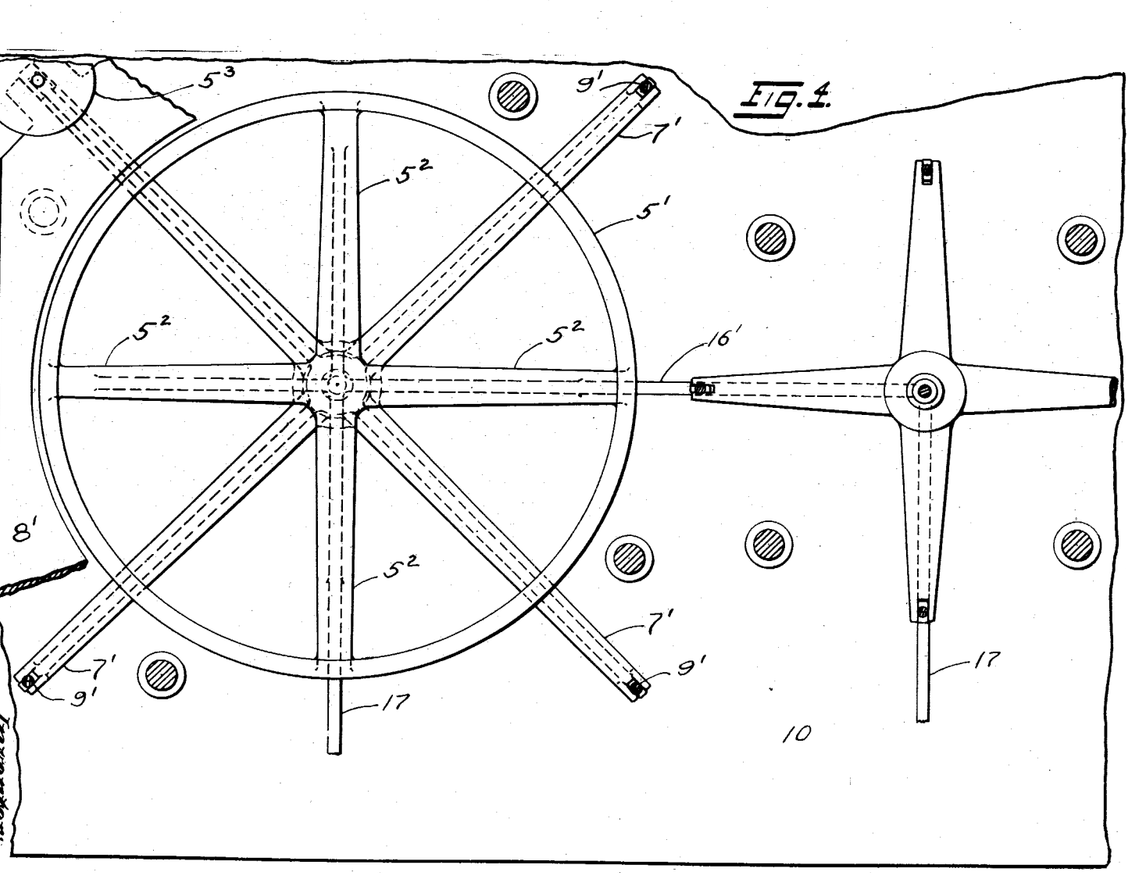
Fig. 4 is a plan view of floors or spiders with their supported elements omitted.
Figures 5, 6, 7, 8, 9:
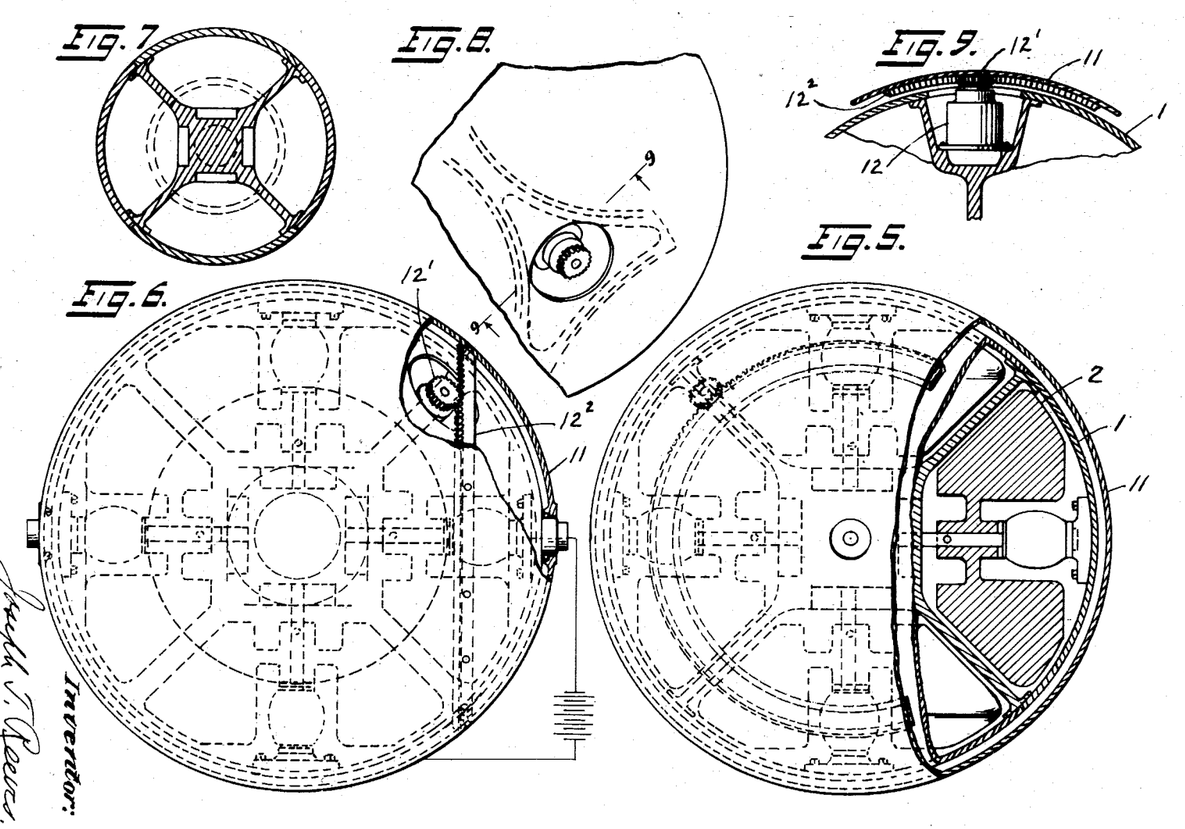
Fig. 5 is a plan of the chart shell broken away to show the spherical case, also broken away showing one of the gyro-rotors in section.
Fig. 6 is a side elevation of the chart shell broken away to show the clock mechanism control.
Fig. 7 is a sectional view (on a smaller scale) of the spherical case and its hub.
Fig. 8 shows the location of the clock mechanism.
Fig. 9 is a section through part of the chart shell and spherical case, showing the clock mechanism and its connection with the chart shell.

Pinioned on the north-south trunnions of the spherical case (1) and made free to revolve about the north-south axis of the case is a spherical shell which will be referred in the description as the chart shell (11). This shell is engraved with the meridian lines and parallels and the lines are plainly marked in various places with their respective numbers indicating longitude and latitude, thus constituting a chart of the entire world. A detachable chart (11') of the specific course of the vehicle, showing all the land marks incident to the course as well as the meridians and parallels is positioned on the chart shell. This detachable chart is made of material that will receive and retain the marks of a carbon pencil or stylus. The detachable chart is added to the instrument for the purpose of furnishing a record of the course pursued by the vehicle and also to show at a glance the proximity of points dangerous to navigation. The spherical case (1) by reason of its gyroscopic control, its Cardan suspension and its pivot support becomes a thing detached in space from all influences outside itself except its contact with the air and the friction of the ball bearings of its trunnions. With these influences eliminated (which is a mechanical impossibility) the spherical case while under full gyroscopic control would occupy a position in space with all its axes maintaining their initial direction no matter where the instrument is carried on the face of the earth. The spherical case (1) would apparently revolve on its north-south axis once in twenty-four hours but it would in reality be a non-revolving sphere carried through space on the surface of a revolving earth. The condition described is utilized in the instrument I have invented in the following manner: The line lying in a plane parallel to the plane of the equator and known to science as the horizontal east-west line changes its direction in space at the rate of one degree every four minutes of time owing to the revolution of the earth. In relation to this horizontal east-west line the spherical case of my instrument is a revolving sphere and as previously stated in the description of the Cardan suspension, &c., would make one revolution every twenty four hours, were it not for the torque imposed by the friction of the ball bearings of the trunnions and the contact with the air. The exact retardation caused by this torque is determined in the laboratory and data obtained for the setting or adjusting of a clock mechanism (12) which is used to govern the revolution of the chart shell (11) about the north-south axis of the spherical case (1). By means of this clock mechanism the chart shell (11) is made to revolve about the spherical case in the opposite direction to the apparent revolution of the case and at the same speed. The clock mechanism has a fixed position in the framework of the spherical case and its mechanical relation and connection with the chart shell is shown in Figs. 6 and 9 where (12) is the clock mechanism, (12') the pinion on the shaft of the clock mechanism and (12²) a circular rack fixed to the inner surface of the chart shell and meshed into the pinion of the clock mechanism. By means of the mechanical devices described I maintain a sphere, the charted surface of which is synchronous with the surface of the earth. The vertical center line of the spherical case will at all times pass through that point on the chart which corresponds with the point on the earth's surface which is occupied by the vehicle at the time of the observation. The means provided to identify this point on the chart is described as follows: A transparent disk (13) with hair lines across its center is sustained or supported by an arm or bridge (13') from the annular section (5') of the rotatable frame. The crossing point of the hair lines will be referred to in the description as the observation point. A holder for a carbon pencil or stylus is made interchangeable with the transparent disk. The observation point is given a fixed and unchanging position in relation to the rotatable frame (5). That position is in the vertical center line of the rotatable frame, immediately above and in close proximity with the chart (11'). As the center of the spherical case (1) and the pivot (6) of the rotatable frame are in this same vertical center line, it is apparent that by controlling the position of the pivot, the position of the observation point in the transparent disk is controlled. The means provided to control the position of the pivot (6) and maintain it in the vertical center line of the spherical case and chart is described as follows: The pivot (6) rests in a socket (7) in the floor or spider (7') previously described and the floor is given a support which admits of oscillation in a horizontal plane. A powerful gyroscopic element is installed on the base plate (10) in a position adjacent to the element already described as comprising the instrument proper. It consists of two gyro-rotors (14) arranged to rotate in opposite directions in parallel horizontal planes on a common vertical axis. These rotors are supported in a framework or casing (14') having a Cardan suspension (14²) in the horizontal plane which includes the center of gravity of the movable mass and which also includes the center of the adjacent spherical shell (1). The suspension described would, if no other influence intervened, permit the axis of the gyros to deviate from the vertical owing to the influence of the rotation of the earth. The attachments which will now be described prevent this deviation. An extension (14³) of the casing (14') is provided which reaches down on the center line of the casing and carries a weight (14⁴) of a predetermined magnitude and adjustable. This weight imposes a constant torque on all the horizontal axis of the gyroscopic element, renders it somewhat pendulous and maintains the gyro-axis in the vertical. The extension (14³) terminates in a ball (14⁵) the center of which is the same distance from the horizontal central plane of the gyroscopic element as is the pivot (6) of the adjacent gyroscopic element of the instrument proper. A floor or spider (15) similar to the one described as supporting the movable element of the instrument proper is suspended in a similar manner from the fixed framework (15') which is supported from the base plate (10) by posts (15²). In the center of the floor (15) is a bushing (14⁶) which fits the ball (14⁵). The rods (15³) which support the floor have universal joints and carry adjustable weights (15⁵) to render the floor non-pendulous. The movements of the ball (14⁵) and the pivot (6) are made synchronous by means of connecting devices which will now be described. The floors or spiders (15) and (7') have extensions (16) which are connected with each other by a rod (16') the length of which is such that it will maintain the pivot (6) and the ball (14⁵) at a distance apart equal to the distance between the centers of the spherical case (1) and the adjacent gyro-element (14'). Below the joints to which the rod (16') is connected the extensions (16) are provided with universal joints (16²) to which are connected racks (17) parallel to each other and extending at right angles to the rod (16'). Each of these racks is meshed into a gear (18) keyed to a vertical shaft having ball bearing journals carried by a frame (19) supported from the base plate (10) on trunnions (19'), permitting oscillation of the frame (19) on a fixed horizontal axis and maintaining said frame in a fixed position longitudinally. The racks are maintained in mesh with their respective gears by ball bearing rollers (20) the retainers (20') of which are free to oscillate about the axis of the gears (18). The distance between the centers of the gears is the same as the distance between the centers of the spherical case and the adjacent gyro-element. The gears (18) are also meshed into a single rack (17') carried on rollers on the oscillating frame (19). This rack is maintained in mesh with the gears by ball-bearing rollers (20²) properly positioned on the frame (19).

By the means described above the pivot (6) of the rotatable frame (5) and the ball (14⁵) of the adjacent gyro-element become absolutely synchronous in all their movements and all the forces which in their final analysis exert themselves to divert the center line of the instrument proper from the vertical are directly opposed by the great gyrostatic force of the adjacent controlling gyrostatic element. It is now apparent that if the center line of the controlling gyrostatic element is maintained in the vertical, the center line of the instrument proper will likewise be maintained in the vertical. The fact that the controlling gyrostatic element is rendered slightly pendulous by the weight (14⁴) to provide a corrective torque to overcome the influence of the rotation of the earth, introduces a disturbing factor which tends to throw the center line of the controlling gyrostatic element out of the vertical when the conditions are such that the forces which set up oscillation in pendulous bodies are operative. For the purpose of determining whether these conditions exist two spirit levels (22) are positioned on the casing (14') of the controlling gyroscopic element at right angles to each other. A handle (23) is provided to enable the observer to apply a torque manually at any time to bring the instrument into the correct postion for observation. This manual torque has no influence on the stability of the spherical case (1) and chart shell (11) of the instrument proper; its influence is directly upon those details of the mechanism which control the position of the observation point.

By the combination of mechanical devices described above I provide an instrument for use in the art of navigation which embodies a chart which is analogous to the surface of the earth, and which is maintained in a position in which all its points and markings are synchronous with the points on the surface of the earth they represent; means for identifying and observing the point on the chart which represents the point on the earth's surface occupied by the vehicle; means for automatically tracing on the chart a line which correctly represents the course which has been traveled by the vehicle and means for indicating the direction in which the vehicle is traveling.

The distinctive feature of the instrument is that there is nothing pendulous; all movable parts having their supports in the plane of their center of gravity. The one exception to this rule is the weight added below the center of gravity of the controlling gyrostatic element and the necessity for this arrangement and its function and control has already been described.

The instrument designed for the use of the aviator differs only in certain details from the one intended for the use of the navigator of the seas. The frames are wider and the clearances are greater to permit the base-plate to assume at times a greater angle to the horizontal plane than is ever attained by that of the instrument used on a ship.

The setting or adjusting of the instrument is accomplished in the following manner: the true north-south line is determined by the usual methods. The instrument is turned on its pivot until the compass card positioned on the annular section 5' of the rotatable frame conforms with this line. The spherical case (1) is tilted on its east-west axis, and revolved on its north-south axis until the point of departure on the chart appears under the point of observation in the transparent disk (13) with the spirit levels (22) indicating that the annular section (5') of the rotatable frame is horizontal. The current is then turned on the motors of all the gyro-rotors and the clock-mechanism and if when full speed is attained, the point of departure does not appear exactly under the point of observation, a torque may be applied manually to bring it into that position. The chart will then be in a position with all its points and markings synchronous with similar points on the earth's surface; and with the gyroscopic and mechanical control described, it will maintain that position. Wherever it is carried over the surface of the earth, it will, at all times, show at the observation point the latitude and longitude of the point on the earth's surface occupied by the vehicle at the time of the observation; and the carbon pencil, when in place, will trace on the chart a line which will correctly represent the course the vehicle has traveled.

Having described my invention and indicated its usefulness, what I claim as new and desire to secure by Letters Patent therefor is:

1. In an instrument designed for use in the art of navigation, a chart, the surface of which is that of a sphere and is inscribed with meridians and parallels; a spherical carrier for the chart; controllable means for rotating the chart about one of the axes of the carrier at a predetermined speed per revolution; means for supporting the carrier in stable equilibrium in a manner that will give it freedom for rotation about any of its axes; gyroscopic means for controlling that rotation; means for pivoting the support of the carrier in a manner that will render the combined weight of the support and supported mass non-pendulous and at the same time free to rotate on its vertical axis; means for preventing any lateral movement of the support and supported mass; means for stabilizing the vertical center line through the chart and spherical carrier; means for identifying on the chart the point where the vertical center line passes; and means for tracing on the chart a line that will correctly represent the successive changes of position of said point; substantially as described.

2. In an instrument designed for use in the art of navigation, a chart, the surface of which is that of a sphere, and is inscribed with meridians and parallels; a spherical case for the purpose of providing a carrier for the chart; a plurality of electrically driven gyroscopic rotors within the case for the purpose of stabilizing the case; a rotatable frame having a pivot in its vertical center line, and having an annular section including a universal Cardan suspension for the spherical case; a floor or spider, suspended from a fixed framework by means of rods having universal joints, and having in its vertical center line a socket to receive the pivot of the rotatable frame; a plurality of rollers on vertical shafts sustained in ball bearings in a fixed position on the fixed framework, giving the rollers contact with the periphery of the annular section of the rotatable frame, to prevent any lateral movement of the frame; adjustable weights carried by extensions of the rods at points above the center of gravity of the gyroscopic element, for the purpose of rendering the entire supported mass non-pendulous; and means for controlling the position of socket in the floor or spider in its relation to the vertical center line of the spherical case; substantially as described.

3. In an instrument designed for use in the art of navigation, a chart, the surface of which is that of a sphere, and is inscribed with meridians and parallels: a spherical case, having trunnions on which the chart may be supported for rotation about one of the axes of the case; a rotatable frame having an annular section, between which and the case is interposed a universal Cardan suspension for the support of the case, and having, in its vertical center line, a pivot, upon which it is supported and about which, it may rotate; a plurality of ball-bearing rollers so positioned on a fixed framework as to maintain contact with the periphery of the annular section of the rotatable frame, to prevent any lateral movement of the annular section of said frame, while permitting near-frictionless rotation of said frame about its vertical axis; a floor or spider suspended from the fixed framework by means of rods having universal joints, and having in its center a socket to receive the pivot of the rotatable frame; and means for controlling the position of the socket in the floor or spider in its relation to the vertical center line of the spherical case; substantially as described.

4. In an instrument designed for use in the art of navigation, a chart, the surface of which is that of a sphere and is inscribed with meridians and parallels; a detachable chart of the specific course of the vehicle positioned on the other or permanent chart; a controlling carrier for the chart; a rotatable, pivoted, annular frame to support the carrier; a universal Cardan suspension interposed between the frame and the carrier; a movable floor or spider (having in its center a socket in which the rotatable frame may be pivoted) supported from a fixed framework by rods having universal joints; a transparent disk having hair lines across its center; a detachable holder, for said disk mounted on the annular section of the rotatable frame, to maintain the said disk in a position immediately above and in close proximity with the chart; a detachable pencil holder (interchangeable with the disk holder) to maintain a carbon pencil in contact with the detachable chart when the transparent disk is not in use; an independently mounted gyrostatic element located adjacent to the chart, its carrier and its support; means for connecting said element with the movable element of said support (namely — the above mentioned floor or spider) by a mechanical synchronizing device embodying a rod having joints to connect specified parts of the two gyroscopic elements; two parallel racks attached by universal joints to specified parts of the two gyroscopic elements, and extending at right angles to the above mentioned connecting rod; a frame; two gear wheels meshed respectively into the parallel racks, and having vertical shafts in ball bearings maintained in a fixed position on said frame; means for supporting said frame from the base plate, comprising a pair of trunnions which permit oscillation of the said frame on its horizontal axis; a third rack meshed into both of the above mentioned gear wheels; and rollers so positioned on the oscillating frame as to retain the racks in mesh with their respective gears; substantially as described.

5. In an instrument designed for use in the art of navigation, a chart, the surface of which is that of a sphere and is inscribed with meridians and parallels; a gyro-controlled carrier for the chart of the character described; means for rotating the chart about one of the axes of the carrier at a predetermined speed per revolution; means for identifying and observing the point on the chart through which the vertical center line passes; and means for tracing on the chart a line that will represent the successive changes of the position of the point through which the vertical center line passes; substantially as described.

6. In an instrument designed for use in the art of navigation, a chart, the surface of which is that of a sphere and is inscribed with meridians and parallels; a gyro-controlled carrier for the chart, of the character described; a rotatable, pivoted frame including a universal Cardan suspension for the carrier; a movable floor or spider having a socket in which the rotatable frame is pivoted; and external means for stabilizing the floor for the purpose of maintaining the pivot of the rotatable frame in the vertical center line of the chart; these external means to consist of an independently mounted gyrostatic element connected as described with the movable floor or spider; substantially as described.

7. In an instrument designed for use in the art of navigation, a chart, the surface of which is that of a sphere and is inscribed with meridians and parallels; a gyro-controlled carrier for the chart; means for supporting the carrier in an annular, pivoted, rotatable frame; means for preventing any lateral movement of the annular section of the rotatable frame; means for controlling the position of the pivot of the rotatable frame in its relation to the vertical center line of the chart carrier; means for supporting interchangeably) a transparent disk immediately above and in close proximity with the chart, or a carbon pencil in contact with the chart in the vertical center line of the chart; substantially as described.

8. In an instrument designed for use in the art of navigation, the combination of a chart, the surface of which is that of a sphere and is inscribed with meridians and parallels; a gyro-controlled carrier for the chart; a clock mechanism to maintain a predetermined relation between the chart and the chart carrier; a rotatable frame for the support of the chart carrier; a movable floor or spider having in its center a socket in which the said rotatable frame may be pivoted; near-frictionless retaining devices, embodying a plurality of ball-bearing rollers maintained in a fixed position on a fixed framework, with the periphery of the rollers in contact with the periphery of the annular section of the rotatable frame; a transparent disk (having hair lines across its center) maintained in a position immediately above and in close proximity with the chart by a detachable holder which is maintained in a positive position on the annular section of the rotatable frame, and is of such form and shape as to bring the crossing point of the hair lines of the transparent disk into the vertical center line of the rotatable frame which includes the pivot of said frame; a detachable pencil holder (interchangeable with the disk holder) to maintain a carbon pencil in a position with its point in contact with the chart at that point on the chart which lies in the vertical center line of the rotatable frame; an independently mounted gyrostatic element located adjacent to the chart and its carrier and supports and a mechanical synchronizing device connecting said gyrostatic element with the movable element of said supports (namely—the above mentioned floor or spider) for the purpose of stabilizing said floor or spider and thereby maintaining the transparent disk or the carbon pencil in the vertical center line which is common to the chart, the chart-carrier and the rotatable frame; substantially as described.

9. In an instrument designed for use in the art of navigation, embodying two distinct gyroscopic elements independently mounted on a common base plate, a mechanical synchronizing device embodying a rod having joints to connect specified parts of the two gyroscopic elements; two parallel racks attached by universal joints to specified parts of the two gyroscopic elements, and extending at right angles to the above mentioned connecting rod; two gear wheels meshed respectively into the racks and having vertical shafts in ball bearings in a frame which is supported from the base plate on trunnions so positioned as to permit oscillation of the frame on its horizontal axis; a third rack meshed into both the above mentioned gear wheels, and rollers positioned on the frame to retain the racks in mesh with their respective gears; substantially as described.

10. In an instrument designed for use in the art of navigation, a rotatable frame for the Cardan support of a unidirectional persisting element, consisting of an annular section from which arms extend downward, terminating in a pivot at a specified point in the vertical center line of the frame; a support for the rotatable frame consisting of a movable floor or spider hung by means of rods with universal joints from a fixed framework, thereby having freedom of movement in a horizontal plane, said floor or spider having a socket at its center to receive the pivot of the rotatable frame, and said rods having extensions reaching above the center of gravity of the suspended mass, carrying weights of a predetermined magnitude to counterbalance the suspended mass and render it non-pendulous; a plurality of ball-bearing rollers maintained in a fixed position on the fixed framework with the periphery of said rollers in contact with the periphery of the annular section of the rotatable frame in the horizontal central plane of said annular section, to prevent any lateral movement of said annular section while permitting near-frictionless rotation of the frame; a gyroscopic stabilizing element embodying two electrically driven gyro-rotors arranged to rotate in opposite directions on a common vertical axis; a casing inclosing and supporting said rotors; means forming a universal Cardan suspension for said casing from the fixed framework of the device, and said casing having an extension reaching down in the line of the axis of the inclosed gyro-rotors, and carrying weights of a predetermined magnitude to maintain the axis of the said gyro-rotors vertical; and a mechanical synchronizing device, of the character described, connecting specified parts of the above described gyroscopic stabilizing element with specified parts of the movable floor or spider which supports the unidirectional persisting element embodied in the instrument proper; substantially as described.

In witness whereof, I have hereunto set my hand this 9th day of August, 1919.

JOSEPH T. REEVES.